Patented Mar. 27, 1928.

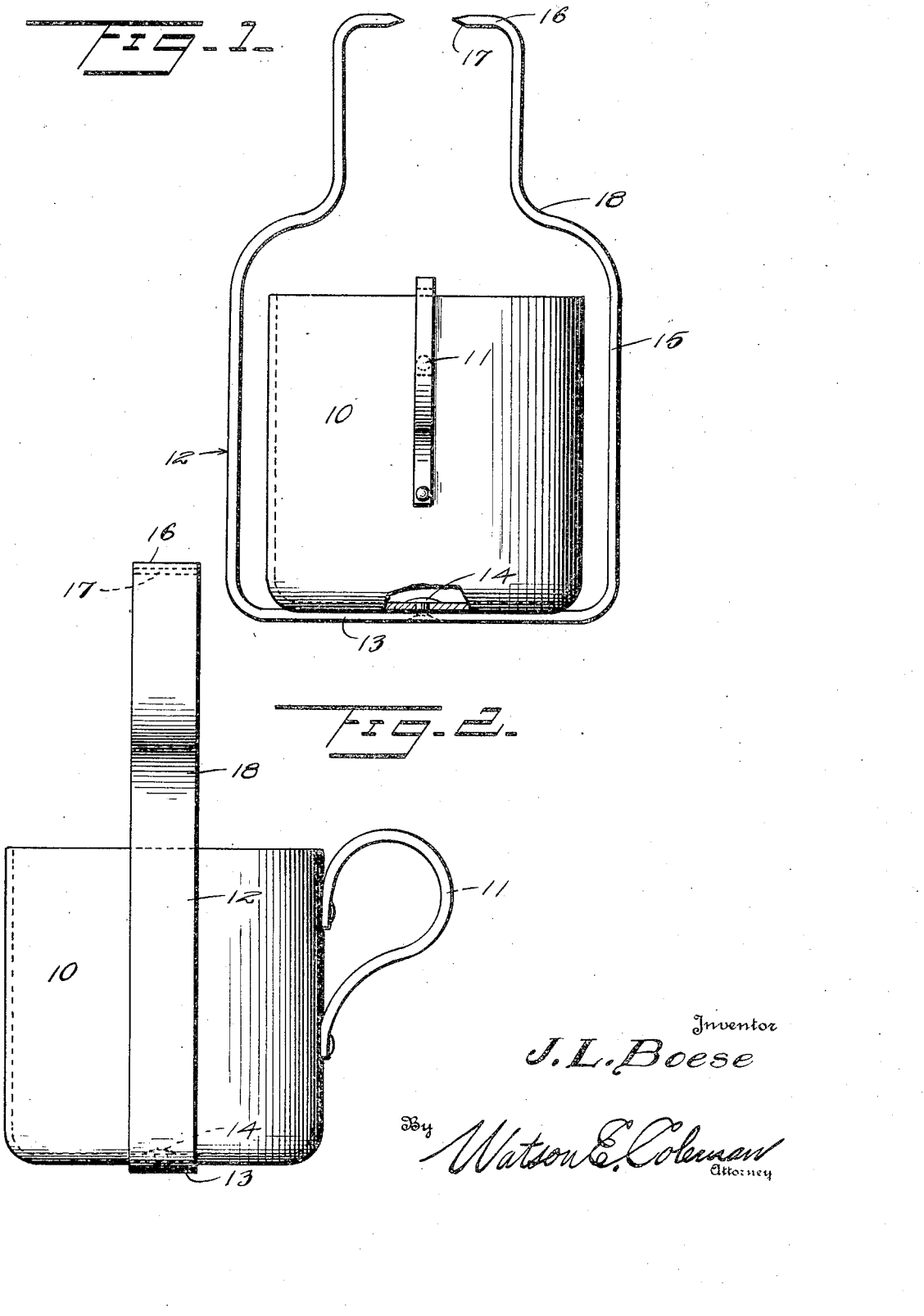

1,664,240

UNITED STATES PATENT OFFICE.

JOHN L. BOESE, OF FOND DU LAC, WISCONSIN.

FRUIT-PICKING IMPLEMENT.

Application filed December 28, 1926. Serial No. 157,578.

This invention relates to a fruit picking implement and more particularly to a device of this character especially adapted for use in picking cherries.

An important object of the invention is to provide a device of this character which may be very cheaply and readily produced, which will be durable and efficient in service and a general improvement in the art.

These and other objects I attain by the construction shown in the accompanying drawings, wherein for the purpose of illustration is shown a preferred embodiment of my invention and wherein:—

Figure 1 is a side elevation of a fruit picker constructed in accordance with my invention, a portion of the receptacle being broken away to show the means for attaching the picking element thereto;

Figure 2 is a side elevation at right angles to the view in Figure 1.

Referring now more particularly to the drawings, the numeral 10 generally designates a receptacle, preferably metallic and provided with a handle 11. In combination with a receptacle of this character, I employ a U-shaped member, generally designated at 12, formed from a flat strip of spring steel or other highly resilient material. The bight portion 13 of this U-shaped member is of greater width than the bottom surface of the receptacle 10 and is secured centrally to the bottom of the receptacle by a rivet 14. The arms 15 of the U-shaped member are each provided at their upper ends with inwardly turned portions 16, the ends of which oppose and are sharpened, as at 17. The arms 15 above the level of the upper surface of the receptacle are offset toward one another, as at 18, so that the portions of the arms lying above these offsets are so spaced that they may be conveniently grasped by the thumb and fingers of the hand of the user, to draw the cutting edges 17 toward one another and thereby sever a fruit stem disposed therebetween. By this structure, the cutting edges are disposed over the mouth of the open receptacle, so that the severed fruit will fall thereinto. The receptacle is spaced sufficiently from the cutting edges to enable an observation of the fruit, while the picker is working at arms length and above the level of his eyes. The hand may be curved about the upper end portions of the arms, so that it combines therewith to provide a funnel directing the fruit into the receptacle.

It will be obvious that such a device may be very readily and cheaply produced and is of such character that it is practically indestructible. It will also be obvious that the structure herein illustrated may be modified to a certain extent and I, therefore, do not limit myself to such specific structure except as hereinafter claimed.

I claim:—

1. In combination, a rigid receptacle, a resilient U-shaped member having the bight portion thereof secured to the under surface of the bottom of the receptacle and the arms thereof extending upwardly along the sides of the receptacle in spaced relation thereto, the upper ends of the arms having inwardly directed portions the confronting faces of which are sharpened to provide cutting edges movable into coacting engagement to shear a fruit stem arranged therebetween.

2. In combination, a rigid receptacle, a resilient U-shaped member having the bight portion thereof secured to the under surface of the bottom of the receptacle and the arms thereof extending upwardly along the sides of the receptacle in spaced relation thereto, the upper ends of the arms having inwardly directed portions the confronting faces of which are sharpened to provide cutting edges movable into coacting engagement to shear a fruit stem arranged therebetween, the upper ends of said arms extending well above the end of the receptacle, said arms immediately above the upper end of the receptacle being offset toward one another to place said upper end portions in such spaced relation as to permit the same to be simultaneously grasped by the thumb and fingers of one hand.

In testimony whereof I hereunto affix my signature.

JOHN L. BOESE.